United States Patent
Nakajima et al.

(10) Patent No.: US 9,453,453 B2
(45) Date of Patent: Sep. 27, 2016

(54) INTERNAL COMBUSTION ENGINE AND STRADDLE-TYPE VEHICLE EQUIPPED WITH THE ENGINE

(75) Inventors: Akitoshi Nakajima, Shizuoka (JP); Toshinori Inomori, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 225 days.

(21) Appl. No.: 13/552,670

(22) Filed: Jul. 19, 2012

(65) Prior Publication Data

US 2013/0019657 A1 Jan. 24, 2013

(30) Foreign Application Priority Data

Jul. 20, 2011 (JP) .................................. 2011-158622

(51) Int. Cl.
| | |
|---|---|
| G01L 23/22 | (2006.01) |
| F01P 1/06 | (2006.01) |
| F02F 1/06 | (2006.01) |
| F02F 1/30 | (2006.01) |
| F02B 61/02 | (2006.01) |
| F02B 77/08 | (2006.01) |
| F02B 75/16 | (2006.01) |

(52) U.S. Cl.
CPC ................. *F01P 1/06* (2013.01); *F02B 61/02* (2013.01); *F02B 77/085* (2013.01); *F02F 1/065* (2013.01); *F02F 1/30* (2013.01); *G01L 23/221* (2013.01); *F02B 75/16* (2013.01)

(58) Field of Classification Search
USPC .............. 73/35.01; 123/41.7, 195 R, 195 AC
See application file for complete search history.

(56) References Cited

U.S. PATENT DOCUMENTS

| | | | |
|---|---|---|---|
| 4,450,709 A | 5/1984 | Hayashi | |
| 4,468,950 A * | 9/1984 | Ishigami et al. | ............. 73/35.09 |
| 4,779,588 A | 10/1988 | Ziegler et al. | |
| 5,744,698 A * | 4/1998 | Genot | .......................... 73/35.11 |
| 6,006,587 A * | 12/1999 | Kiuregyan et al. | .......... 73/35.02 |
| 6,044,811 A * | 4/2000 | Kouchi et al. | ............... 123/41.7 |
| 6,411,886 B1 * | 6/2002 | Morra et al. | .................. 701/111 |
| 7,055,495 B2 * | 6/2006 | Yamaoka et al. | ............. 123/305 |
| 2002/0029752 A1 * | 3/2002 | Laimbock | ................. F01P 3/04 |
| | | | 123/41.57 |
| 2004/0149241 A1 * | 8/2004 | Shomura et al. | ............ 123/41.7 |

(Continued)

FOREIGN PATENT DOCUMENTS

| | | |
|---|---|---|
| CN | 1605735 A | 4/2005 |
| CN | 1991147 A | 7/2007 |

(Continued)

OTHER PUBLICATIONS

Nakajima et al.; "Internal Combustion Engine and Straddle-Type Vehicle Equipped With the Engine"; U.S. Appl. No. 13/552,669, filed Jul. 19, 2012.

(Continued)

*Primary Examiner* — Xin Zhong
(74) *Attorney, Agent, or Firm* — Keating & Bennett, LLP (57) ABSTRACT

In a single-cylinder internal combustion engine fitted with a knock sensor, a temperature increase of the knock sensor is suppressed and prevented and the reliability of the knock sensor is improved. The engine includes a crankcase accommodating a crankshaft, a cylinder block connected to the crankcase and including a cylinder provided therein, a cylinder head connected to the cylinder block, a sensor mounting boss provided on the cylinder block, a knock sensor arranged to detect knocking and mounted to the boss, a fan to guide air to at least the sensor mounting boss, and an air shroud.

18 Claims, 6 Drawing Sheets

(56) References Cited

U.S. PATENT DOCUMENTS

2005/0076860 A1    4/2005  Tomita
2008/0295577 A1*  12/2008  Maehara et al. ............. 73/35.01
2012/0277951 A1*  11/2012  Sandel ............................ 701/36

FOREIGN PATENT DOCUMENTS

| CN | 101713341 A | 5/2010 |
| DE | 3616636 A1 | 11/1987 |
| EP | 0 079 042 A1 | 5/1983 |
| EP | 1 522 705 A2 | 4/2005 |
| JP | 61-117418 A | 6/1986 |
| JP | 2004-301106 A | 10/2004 |
| TW | I222490 B | 10/2004 |
| TW | 200424427 A | 11/2004 |

OTHER PUBLICATIONS

Nakajima et al.; "Internal Combustion Engine and Straddle-Type Vehicle Equipped With the Engine"; U.S. Appl. No. 13/552,671, filed Jul. 19, 2012.

Nakajima et al.; "Internal Combustion Engine and Straddle-Type Vehicle Equipped With the Engine"; U.S. Appl. No. 13/552,672, filed Jul. 19, 2012.

Official Communication issued in corresponding European Patent Application No. 12176486.4, mailed on Apr. 4, 2013.

Official Communication issued in corresponding Chinese Application No. 201210259880.5, mailed on Mar. 5, 2014.

Official Communication issued in corresponding Taiwanese Patent Application No. 101126091, mailed on May 5, 2015.

* cited by examiner

INTERNAL COMBUSTION ENGINE AND STRADDLE-TYPE VEHICLE EQUIPPED WITH THE ENGINE

BACKGROUND OF THE INVENTION

1. Field of the Invention

The present invention relates to an internal combustion engine fitted with a sensor arranged to detect knocking. The present invention also relates to a straddle-type vehicle equipped with the engine.

2. Description of the Related Art

An internal combustion engine can cause knocking in some cases depending on its operating conditions. Knocking should be avoided as much as possible because it results in, for example, unusual noise and performance degradation of the internal combustion engine. Conventionally, it is known that a sensor to detect knocking, that is, a knock sensor, is fitted to an internal combustion engine. It is also known that, upon detecting knocking by the knock sensor, an action such as changing ignition timing is taken.

JP 2004-301106 A discloses a water-cooled engine in which a knock sensor is fitted to a cylinder block.

A water-cooled engine needs a flow passage for coolant, i.e., a water jacket, to be provided in, for example, a cylinder block and a cylinder head. It also requires, for example, a pump to convey the coolant and a radiator to cool the coolant. For this reason, the structure of the water-cooled engine tends to be complicated.

A straddle-type vehicle equipped with a single-cylinder internal combustion engine (hereinafter referred to as a "single-cylinder engine") is known, such as a relatively small-sized motorcycle. The single-cylinder engine has the advantage that it has a simpler structure than a multi-cylinder engine. To fully exploit the advantage, the single-cylinder engine has a relatively simple cooling structure. For that reason, conventionally, at least a portion of the cylinder block and the cylinder head is cooled by air.

In a single-cylinder engine at least a portion of which is cooled by air, temperature variations may occur locally depending on the flow of the air around the engine. In other words, depending on the flow of the air, there may be a portion in which the temperature is high locally and a portion in which the temperature is low locally. If the knock sensor is mounted to the portion of the engine in which the temperature is high, the knock sensor is heated by the engine, and the temperature of the knock sensor is raised excessively. As a consequence, the reliability of the knock sensor may become lower.

In a water-cooled type engine as well, temperature variations may be caused locally depending on the shape or dimensions of the water jacket, or the flowing condition of the coolant, and the like. Accordingly, the same problem as described above may arise.

SUMMARY OF THE INVENTION

In view of the problems described above, preferred embodiments of the present invention suppress and prevent the temperature increase of the knock sensor and improve the reliability of the knock sensor in a single-cylinder internal combustion engine fitted with a knock sensor.

An internal combustion engine according to a preferred embodiment of the present invention is preferably a single-cylinder internal combustion engine for a vehicle including: a crankcase accommodating a crankshaft; a cylinder block connected to the crankcase and including a cylinder provided therein; a cylinder head connected to the cylinder block; a sensor mounting boss provided on the crankcase, the cylinder block, or the cylinder head; a sensor to detect knocking and mounted to the boss; and an air guide member mounted to at least a portion of the crankcase, the cylinder block, or the cylinder head, to guide air at least to the boss.

Preferred embodiments of the present invention make it possible to suppress and prevent the temperature increase of the knock sensor and to improve the reliability of the knock sensor in a single-cylinder internal combustion engine fitted with a knock sensor.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
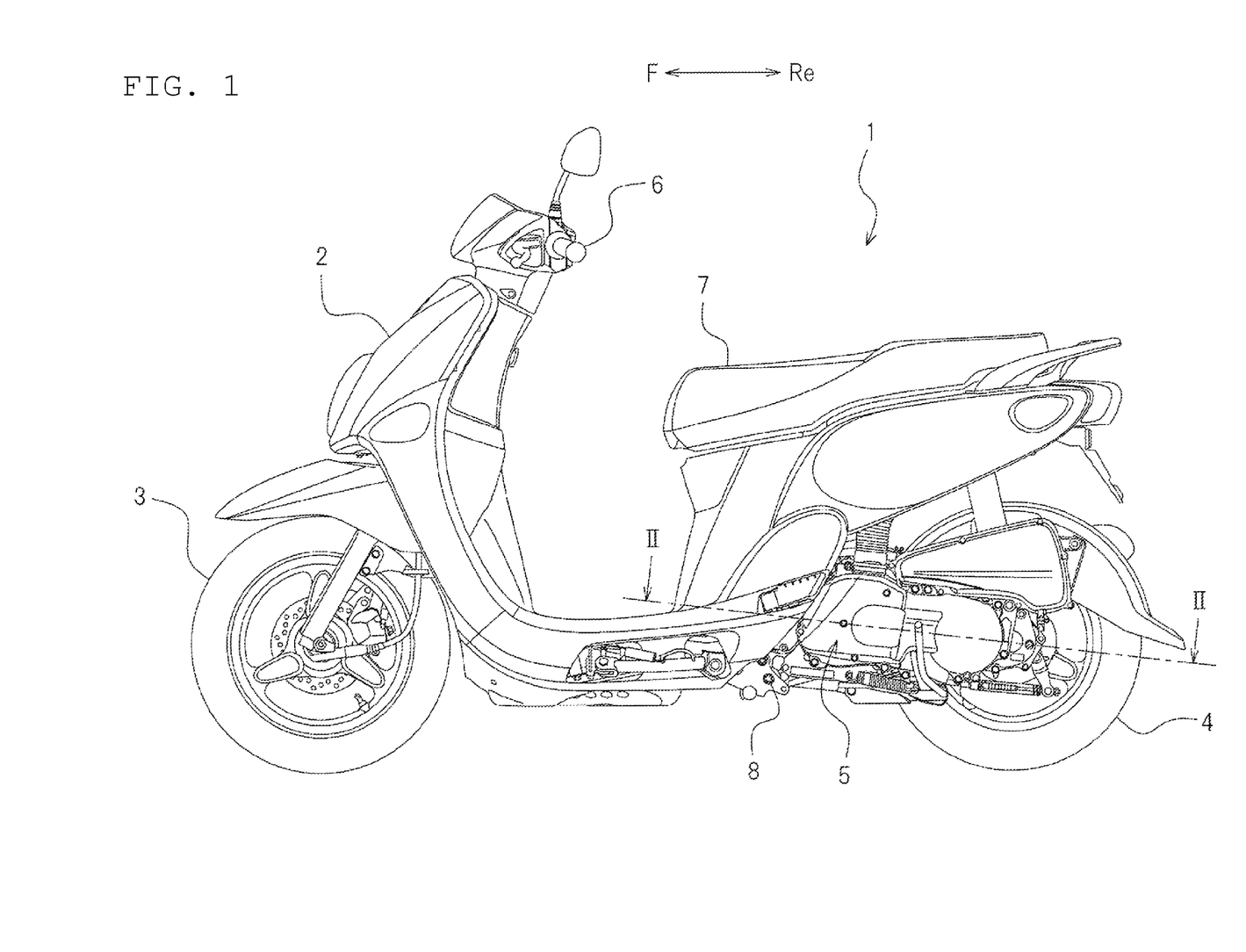
FIG. 1 is a left side view of a motorcycle according to a first preferred embodiment of the present invention.

As illustrated in FIG. 1, the straddle-type vehicle according to a first preferred embodiment is preferably a scooter type motorcycle 1, for example. Although the motorcycle 1 is one example of a straddle-type vehicle according to a preferred embodiment of the present invention, the straddle-type vehicle is not limited to the scooter type motorcycle 1. The straddle-type vehicle may be any other type of motorcycle, such as a moped type motorcycle, an off-road type motorcycle, or an on-road type motorcycle, for example. In addition, the straddle-type vehicle is intended to mean any type of vehicle on which a rider straddles the vehicle, and it is not limited to a two-wheeled vehicle. The straddle-type vehicle may be, for example, a three-wheeled vehicle that changes its traveling direction by leaning the vehicle body. The straddle-type vehicle may be other types of straddle-type vehicle such as an ATV (All Terrain Vehicle), for example.

In the following description, the terms "front," "rear," "left," and "right" respectively refer to front, rear, left, and right based on the perspective of the rider of the motorcycle 1. Reference characters F, Re, L, and R in the drawings indicate front, rear, left, and right, respectively.

The motorcycle 1 includes a vehicle body 2, a front wheel 3, a rear wheel 4, and an engine unit 5 to drive the rear wheel 4. The vehicle body 2 includes a handlebar 6, which is operated by the rider, and a seat 7, on which the rider is to be seated. The engine unit 5 is what is called a unit swing type engine unit, and it is supported by a body frame, not shown in the drawings, so that it can pivot about a pivot shaft 8. The engine unit is supported so as to be swingable relative to the body frame.

Figure 2:
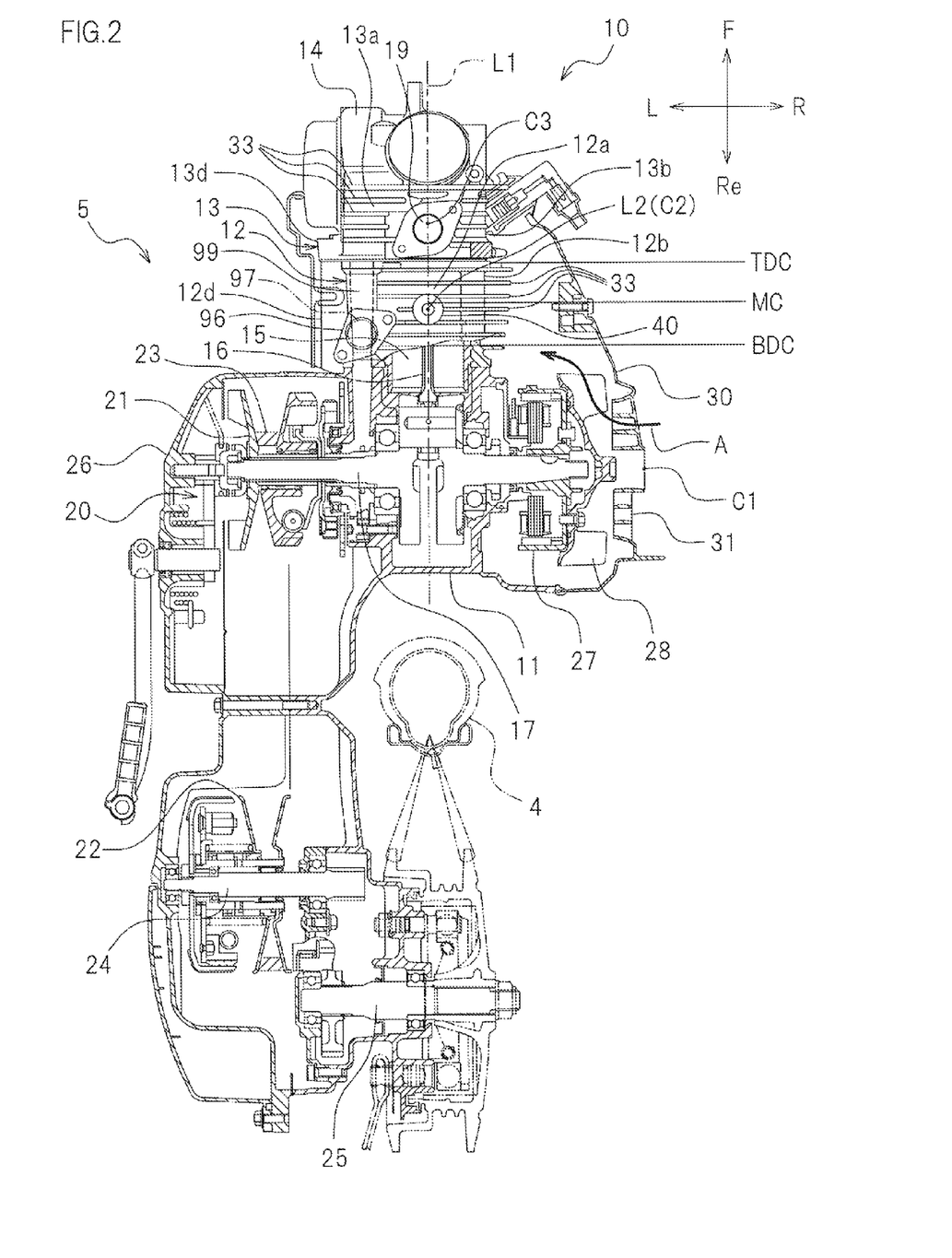
FIG. 2 is a cross-sectional view taken along line II-II of FIG. 1.

FIG. 2 is a cross-sectional view taken along line II-II of FIG. 1. As illustrated in FIG. 2, the engine unit 5 includes an engine 10, which is one example of the internal combustion engine according to a preferred embodiment of the present invention, and a V-belt type continuously variable transmission (hereinafter referred to as "CVT") 20. The CVT 20 is one example of a transmission. In the present preferred embodiment, the engine 10 and the CVT 20 integrally form the engine unit 5, but it is of course possible that the engine 10 and a transmission may be separated from each other.

The engine 10 is preferably an engine that includes a single cylinder, in other words, a single-cylinder engine, for example. The engine 10 is preferably a four-stroke engine, which repeats an intake stroke, a compression stroke, a combustion stroke, and an exhaust stroke, one after another, for example. The engine 10 includes a crankcase 11, a cylinder block 12 extending frontward from the crankcase 11, a cylinder head 13 connected to a front portion of the cylinder block 12, and a cylinder head cover 14 connected to a front portion of the cylinder head 13. A cylinder 15 is provided inside the cylinder block 12.

The cylinder 15 may be defined by a cylinder liner inserted in the body of the cylinder block 12 (i.e., in the portion of the cylinder block 12 other than the cylinder 15) or may be integrated with the body of the cylinder block 12. In other words, the cylinder 15 may be formed either separate from or integral with the body of the cylinder block 12. A piston, not shown in the drawings, is slidably accommodated in the cylinder 15.

The cylinder head 13 covers a front portion of the cylinder 15. A recessed portion, not shown in the drawings, and an intake port and an exhaust port, also not shown in the drawings, that are connected to the recessed portion are provided in the cylinder head 13. An intake pipe 35 (see FIG. 3) is connected to the intake port, and an exhaust pipe 38 is connected to the exhaust port. The top surface of the piston, the inner circumferential surface of the cylinder 15, and the recessed portion together define a combustion chamber, which is not shown in the drawings. The piston is coupled to a crankshaft 17 via a connecting rod 16. The crankshaft 17 extends leftward and rightward. The crankshaft 17 is accommodated in the crankcase 11.

In the present preferred embodiment, the crankcase 11, the cylinder block 12, the cylinder head 13, and the cylinder head cover 14 are separate parts and are fitted to each other. However, they may not be separate parts but may be integrated with each other as appropriate. For example, the crankcase 11 and the cylinder block 12 may be formed integrally with each other, or the cylinder block 12 and the cylinder head 13 may be formed integrally with each other. Alternatively, the cylinder head 13 and the cylinder head cover 14 may be formed integrally with each other.

The CVT 20 includes a first pulley 21, which is a driving pulley, a second pulley 22, which is a driven pulley, and a V-belt 23 wrapped around the first pulley 21 and the second pulley 22. A left end portion of the crankshaft 17 protrudes to the left from the crankcase 11. The first pulley 21 is fitted to the left end portion of the crankshaft 17. The second pulley 22 is fitted to a main shaft 24. The main shaft 24 is coupled to a rear wheel shaft 25 via a gear mechanism, which is not shown in the drawings. FIG. 2 depicts the state in which the transmission ratio for a front portion of the first pulley 21 and the transmission ratio for a rear portion of the first pulley 21 are different from each other. The second pulley 22 preferably has the same configuration. A transmission case 26 is provided on the left side of the crankcase 11. The CVT 20 is accommodated in the transmission case 26.

An alternator 27 is provided on a right side portion of the crankshaft 17. A fan 28 is secured to a right end portion of the crankshaft 17. The fan 28 rotates with the crankshaft 17. The fan 28 is arranged such to suck air to the left by rotating. An air shroud 30 is disposed on the right side of the crankcase 11, the cylinder block 12, and the cylinder head 13. The alternator 27 and the fan 28 are accommodated in the air shroud 30. The air shroud 30 covers at least a portion of the cylinder block 12 and the cylinder head 13, and here, the air shroud 30 mainly serves the role of guiding air to the crankcase 11, the cylinder block 12, and the cylinder head 13. A suction port 31 is provided in the air shroud 30. The suction port 31 is positioned on the right side of the fan 28. The suction port 31 is arranged at a position facing the fan 28. More specifically, the fan 28 that is driven by the crankshaft 17 is disposed at a side of the crankcase 11, and the suction port 31 is arranged at a position facing the fan 28. As indicated by arrow A in FIG. 2, the air sucked by the fan 28 is introduced through the suction port 31 into the air shroud 30 and is supplied to, for example, the crankcase 11, the cylinder block 12, and the cylinder head 13.

Figure 3:
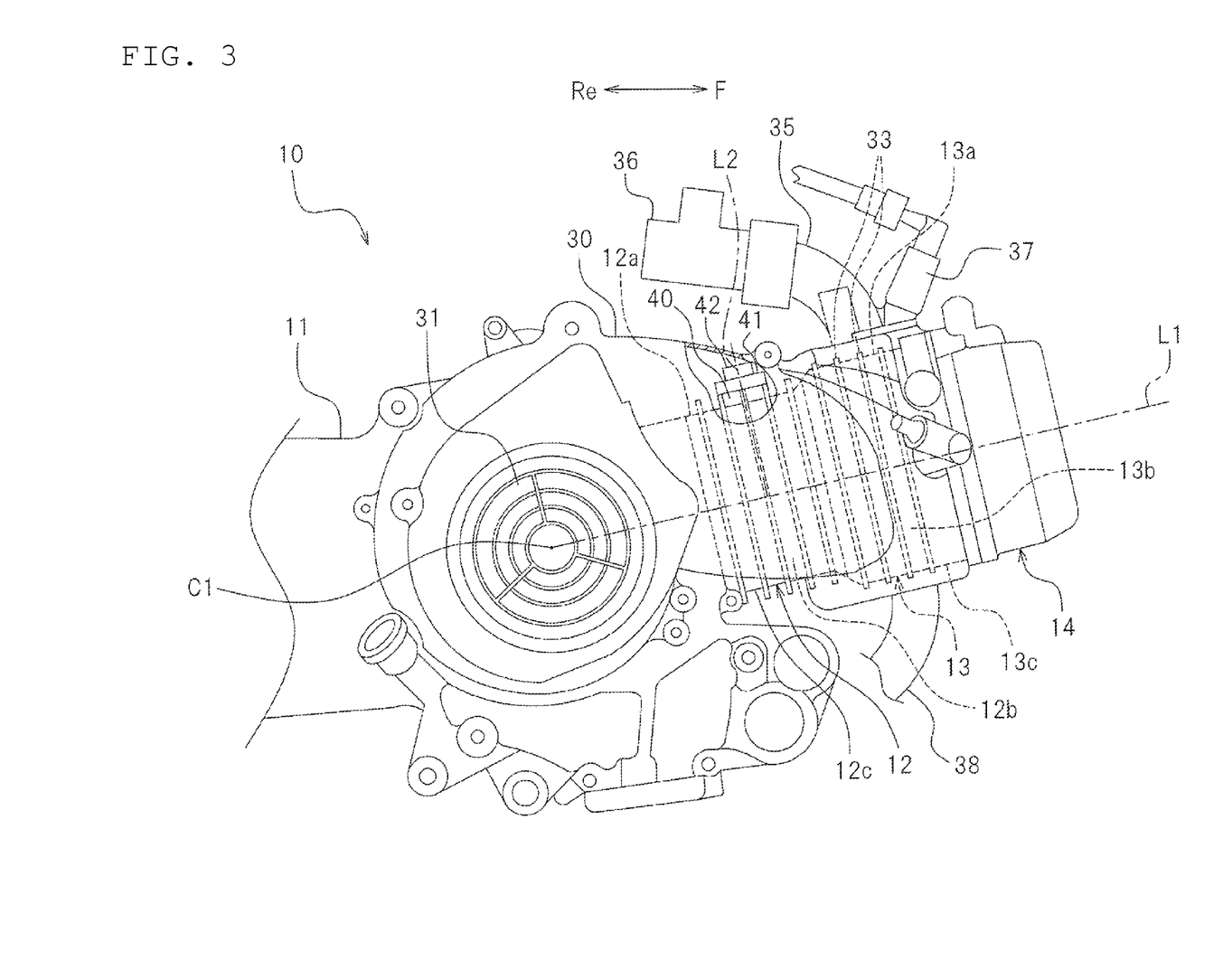
FIG. 3 is a right side view illustrating a portion of an engine according to the first preferred embodiment of the present invention.

FIG. 3 is a right side view illustrating a portion of the engine 10. As illustrated in FIG. 3, the air shroud 30 is mounted to the crankcase 11, the cylinder block 12, and the cylinder head 13, and it extends frontward along the cylinder block 12 and the cylinder head 13. The air shroud 30 covers right side portions of the crankcase 11, the cylinder block 12, and the cylinder head 13. In addition, the air shroud 30 partially covers upper and lower portions of the cylinder block 12 and the cylinder head 13.

As illustrated in FIG. 3, the engine 10 according to a preferred embodiment of the present preferred embodiment is a type of engine in which the cylinder block 12 and the cylinder head 13 extend in a horizontal direction or in a direction inclined slightly upward with respect to a horizontal direction toward the front, that is, what is called a horizontally mounted type engine. Reference character L1 represents a line that passes through the center of the cylinder 15 (see FIG. 2, the line is hereinafter referred to as the "cylinder axis"). The cylinder axis L1 extends in a horizontal direction or in a direction slightly inclined from a horizontal direction. It should be noted, however, that the direction of the cylinder axis L1 is not particularly limited. For example, the inclination angle of the cylinder axis L1 with respect to the horizontal plane may be from, for example, 0° to 15°, or may be greater.

The engine 10 according to the present preferred embodiment is an air-cooled engine, the entire body of which is cooled by air. As illustrated in FIG. 2, a plurality of cooling fins 33 are provided on the cylinder block 12 and the cylinder head 13. However, the engine 10 may be an engine that includes the cooling fins 33 but also a portion of which is cooled by coolant. In other words, the engine 10 may be an engine a portion of which is cooled by air but another portion of which is cooled by coolant.

Although the specific shape of the fins 33 is not particularly limited, the fins 33 of the engine 10 according to the present preferred embodiment preferably have the following shape. The fins 33 according to the present preferred embodiment protrude from the surfaces of the cylinder block 12 and the cylinder head 13 and extend so as to be orthogonal or substantially orthogonal to the cylinder axis L1. In other words, the fins 33 extend in a direction orthogonal or substantially orthogonal to the surfaces of the cylinder block 12 and the cylinder head 13. The fins 33 are arrayed in a direction along the cylinder axis L1. Gaps are provided between adjacent fins 33. The gap between the fins 33 may be uniform or may not be uniform.

In the present preferred embodiment, the fins 33 that are provided on the cylinder block 12 are arranged over the top surface 12a, the right surface 12b, and the bottom surface 12c (see FIG. 3) of the cylinder block 12. The fins 33 that are provided on the cylinder head 13 are arranged over the top surface 13a, the right surface 13b, the bottom surface 13c (see FIG. 3), and the left surface 13d of the cylinder head 13. It should be noted, however, that the position of the fins 33 is not particularly limited. The fins 33 may be provided either only on the cylinder block 12 or only on the cylinder head 13.

The thicknesses of the plurality of fins 33 preferably are equal to each other. However, the fins 33 may have different thicknesses one from another. Each one of the fins 33 may have a uniform thickness irrespective of the location therein or may have different thicknesses from one location therein to another. In other words, the thickness of each of the fins 33 may be locally different.

In the present preferred embodiment, each of the fins 33 may preferably have a flat plate shape so that the surface of the fin 33 is a flat surface. However, the fin 33 may be curved, and the surface of the fin 33 may be a curved surface. In addition, the shape of the fin 33 is not limited to a flat plate shape, and the fin 33 may have various other shapes such as needle shapes and hemispherical shapes. When the fin 33 has a flat plate shape, the fin 33 does not need to extend in a direction orthogonal or substantially orthogonal to the cylinder axis L1 but may extend in a direction parallel or substantially parallel to the cylinder axis L1. Alternatively, the fin 33 may extend in a direction inclined with respect to the cylinder axis L1. The plurality of the fins 33 may extend either in the same direction or in different directions from each other.

As illustrated in FIG. 2, a sensor mounting boss 40 is preferably provided on the top surface 12a of the cylinder block 12. The boss 40 is preferably disposed above the cylinder block 12. In other words, the boss 40 is disposed above the engine body (that is, the portion of the engine 10 excluding the boss 40). As viewed in plan, the boss 40 is disposed at a position that overlaps with the engine body. As will be described below, an intake pipe 35 is connected to the top surface of the cylinder head 13. The boss 40 is provided on a surface of the cylinder block 12 that corresponds to the surface of the cylinder head 13 to which the intake pipe 35 is connected. It is also possible to provide the boss 40 on the cylinder head 13. The boss 40 may be provided on the top surface of the cylinder head 13, or may be provided on the surface of the cylinder head 13 to which the intake pipe 35 is connected.

In FIG. 2, reference numeral 19 is an intake port. Although not shown in the drawings, the intake port extends obliquely downward and rearward, forming a curve. As illustrated in FIG. 2, the right end of the boss 40 is positioned more to the right than the left end of the intake port 19, and the left end of the boss 40 is positioned more to the left than the right end of the intake port 19. That is, at least a portion of the boss 40 and at least a portion of the intake port 19 are disposed at an aligned position with respect to the left-right direction. In other words, at least a portion of the boss 40 and at least a portion of the intake port 19 are aligned, one in front and the other behind. Here, when viewed from a direction orthogonal or substantially orthogonal to the cylinder axis L1, both the center of the boss 40 and the center of the intake port 19 are positioned on the cylinder axis L1. Thus, at least a portion of the boss 40 and at least a portion of the intake port 19 are at an aligned position with respect to the left-right direction so that a knock sensor 41 to be mounted to the boss 40 can be protected by the intake port 19 from a flying stone or the like from the front. In addition, the knock sensor 41 can be protected by the intake pipe 35 mounted to the intake port 19.

A chain case 99 is provided on a left side portion of the cylinder block 12. A cam chain is disposed inside the chain case 99. A mount portion 96 to mount a cam chain tensioner 97 is provided on a portion of the chain case 99, that is, on a left side portion of the top surface 12a of the cylinder block 12. The cam chain tensioner 97 is inserted into a hole of the mount portion 96 so as to come into contact with the cam chain. The rear end of the boss 40 is positioned more to the rear than the front end of the cam chain tensioner 97, and the front end of the boss 40 is positioned more to the front than the rear end of the cam chain tensioner 97. That is, at least a portion of the boss 40 and at least a portion of the cam chain tensioner 97 are disposed at an aligned position with respect to the front-rear direction. In other words, at least a portion of the boss 40 and at least a portion of the cam chain tensioner 97 are lined up, one on the right and the other on the left. Thus, the knock sensor 41 mounted to the boss 40 can be protected by the mount portion 96 and the cam chain tensioner 97.

The boss 40 preferably has a tubular shape with a large wall thickness. The top surface of the boss 40 preferably has a flat surface. It should be noted, however, that the shape of the boss 40 is not particularly limited as long as the later-described knock sensor 41 can be mounted thereto. In the present preferred embodiment, the boss 40 is continuous with some of the fins 33. In other words, the boss 40 is connected to some of the fins 33. More specifically, no gap is provided between the boss 40 and those fins 33. The boss 40 and those fins 33 are preferably integrally formed with each other.

In the present preferred embodiment, the boss 40 is connected to three of the fins 33, for example. It should be noted, however, that the number of the fins 33 that are connected to the boss 40 is not limited to three. The boss 40 may be connected to either a plurality of the fins 33 or with only one of the fins 33.

In addition, although the boss 40 is connected to some of the fins 33 in the present preferred embodiment, the boss 40 may not be connected to the fins 33. The boss 40 may be provided at a portion of the cylinder block 12 or the cylinder head 13 where the fins 33 are not provided.

As illustrated in FIG. 2, the boss 40 is arranged at a position overlapping the cylinder axis L1, as viewed in plan. The boss 40 is provided at a position such that an extension line L2 of the center of the boss 40 (see FIG. 3) intersects with the cylinder axis L1. The boss 40, however, may be arranged at a position such that the extension line L2 of the center of the boss 40 does not intersect with the cylinder axis L1. For example, the boss 40 may be arranged at a position that overlaps with an inner portion of the cylinder 15 but does not overlap with the cylinder axis L1, when viewed from a direction along the center of the boss 40. It is also possible to arrange the boss 40 at a position that does not overlap with an inner portion of the cylinder 15, when viewed from a direction along the center of the boss 40.

The front-rear position of the boss 40 is not particularly limited. In the present preferred embodiment, the center C2 of the boss 40 is preferably positioned closer to the bottom dead center BDC than the midpoint MC between the top dead center TDC and the bottom dead center BDC of the piston, as illustrated in FIG. 2. It is also possible to dispose the boss 40 further closer to the bottom dead center BDC. Conversely, it is also possible to dispose the boss 40 so that the center C2 of the boss 40 is positioned closer to the top dead center TDC than the midpoint MC between the top dead center TDC and the bottom dead center BDC of the piston.

As illustrated in FIG. 3, the height of the boss 40 may be the same as the height of the fins 33. Alternatively, the height of the boss 40 may be higher than the height of the fins 33. In other words, a portion of the boss 40 may protrude above the fins 33. Alternatively, the height of the boss 40 may be lower than the height of the fins 33. The boss 40 extends in a direction orthogonal or substantially orthogonal to the top surface 12a of the cylinder block 12. Since the fins 33 protrude in a direction orthogonal or substantially orthogonal to the top surface 12a of the cylinder block 12, the protruding direction of the boss 40 and the protruding direction of the fins 33 are parallel or substantially parallel to each other. However, the protruding direction of the boss 40 is not particularly limited, and the boss 40 may protrude in a direction inclined with respect to the top surface 12a of the cylinder block 12.

As illustrated in FIG. 2, the center C2 of the boss 40 is positioned more to the rear than the center C3 of the cylinder head 13. Note that the term "the center C3 of the cylinder head 13" herein means the midpoint between one end of the cylinder head 13 along the cylinder axis L1 and the other end thereof. Reference character C3 shown in FIG. 2 indicates an approximate position of the center of the cylinder head 13, but it does not necessarily indicate the precise center of the cylinder head 13. The center C2 of the boss 40 is closer to the center C1 of the suction port 31 of the air shroud 30 than to the center C3 of the cylinder head 13. In other words, the distance between the center C1 of the suction port 31 and the center C2 of the boss 40 is shorter than the distance between the center C1 of the suction port 31 and the center C3 of the cylinder head 13.

As illustrated in FIG. 3, the knock sensor 41 arranged to detect knocking is mounted on the boss 40. When knocking occurs, the combustion pressure abruptly changes, so specific vibration occurs in, for example, the cylinder block 12 and the cylinder head 13. As the knock sensor 41, it may be preferable to use, for example, a sensor that detects vibration and converts the vibration into an electric signal to output the signal (for example, a sensor equipped with a piezoelectric element). The type of the knock sensor 41 is, however, not particularly limited.

Figure 4:
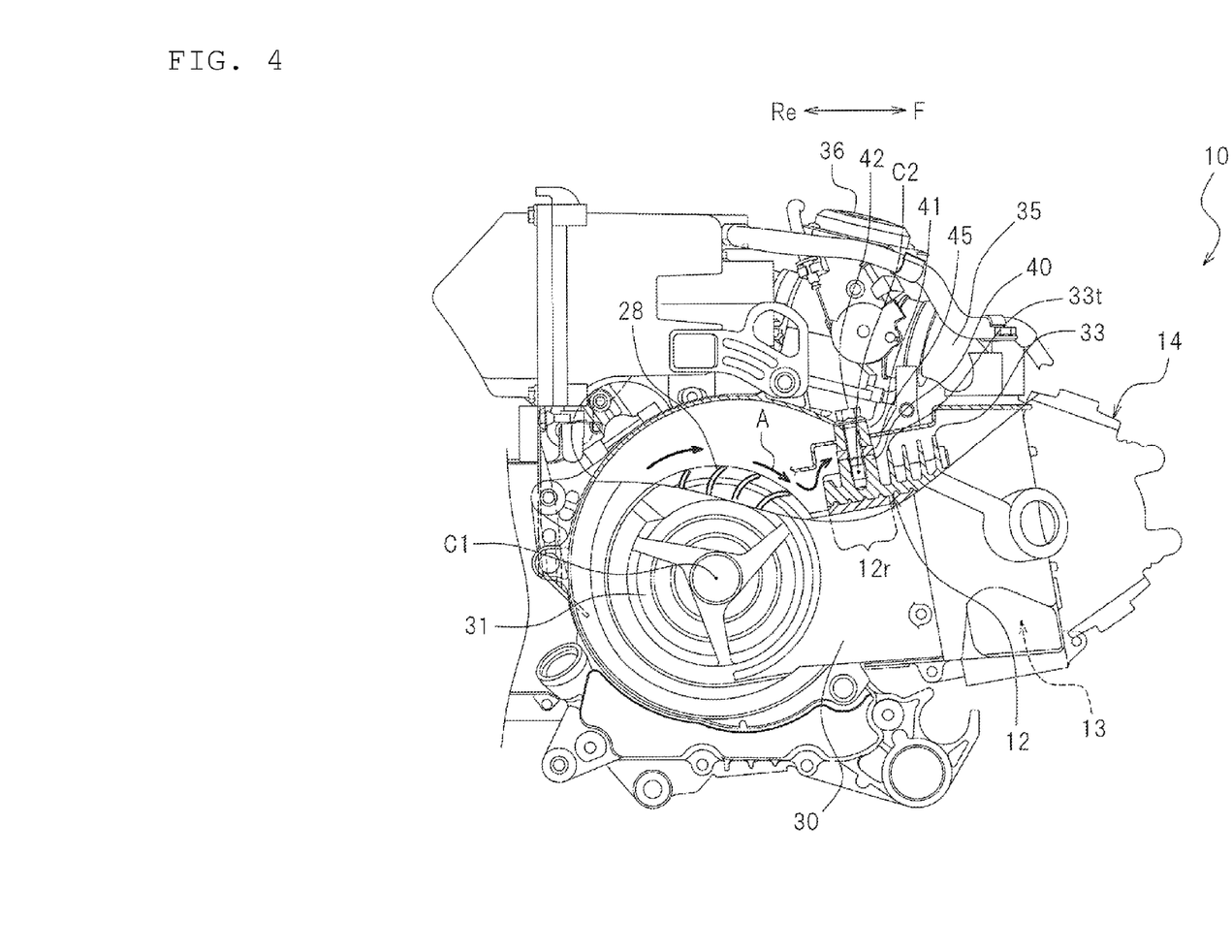
FIG. 4 is a right side view illustrating a portion of an engine according to a second preferred embodiment of the present invention.

The shape of the knock sensor 41 is not particularly limited either. In the present preferred embodiment, however, the knock sensor 41 preferably has an annular shape having a flat top surface and a flat bottom surface. The knock sensor 41 is preferably mounted to the boss 40 by a bolt 42. The bolt 42 is made of a metal, for example. The material of the bolt 42 is not particular limited, and preferred examples include steel and an aluminum alloy. As illustrated in FIG. 4, the knock sensor 41 can be fitted by placing the knock sensor 41 on the boss 40, inserting the bolt 42 through the knock sensor 41 and the boss 40, and thereafter tightening the bolt 42. A helical groove that engages with the bolt 42 may be arranged in an inner circumferential surface of the boss 40. Thereby, when the bolt 42 is rotated, the bolt 42 and the boss 40 are directly engaged with each other. However, the method of securing the bolt 42 is not particularly limited. Another possible method is as follows. A bolt 42 (which does not have a head but has only a shaft portion) is embedded in the boss 40 in advance, then the knock sensor 41 and a nut are fitted to the bolt 42 successively, and then, the nut is tightened.

As illustrated in FIG. 3, the intake pipe 35 is connected to the top surface 13a of the cylinder head 13. A throttle body 36 that accommodates a throttle valve, which is not shown in the drawings, is connected to the intake pipe 35. When viewed from the side, the knock sensor 41 is disposed below the intake pipe 35 or the throttle body 36. A fuel injection valve 37 is disposed in front of the intake pipe 35. When viewed from the side, the knock sensor 41 is disposed on the opposite side of the intake pipe 35 (the left side of FIG. 3) to the side on which the fuel injection valve 37 is disposed (the right side of FIG. 3). The exhaust pipe 38 is connected to the bottom surface 13c of the cylinder head 13.

As described previously, the combustion chamber is provided in the cylinder block 12 and the cylinder head 13. When knocking occurs in the combustion chamber, vibration resulting from the knocking propagates from the combustion chamber to the cylinder block 12, the cylinder head 13, and so forth. In the present preferred embodiment, the knock sensor 41 is preferably mounted to the cylinder block 12. The knock sensor 41 is disposed in the vicinity of the combustion chamber, in other words, in the vicinity of the location at which knocking occurs. As a result, it is possible to detect knocking with high accuracy by the knock sensor 41.

Although the vicinity of the combustion chamber is a location suitable to detect knocking, it is a location in which the temperature is high. The temperature of the cylinder block 12 tends to be higher than that of the crankcase 11. For this reason, merely providing the knock sensor 41 on the cylinder block 12 can cause the knock sensor 41 to be heated by the cylinder block 12 with a high temperature, so there is a risk that the temperature of the knock sensor 41 may become too high. When the temperature of the knock sensor 41 becomes too high, the lifetime of the knock sensor 41 may be shortened.

The heat generated by combustion in the combustion chamber is conducted mainly from the cylinder block 12 via the boss 40 to the knock sensor 41. That is, the knock sensor 41 is heated mainly by heat conduction from the boss 40. However, with the engine 10 according to the present preferred embodiment, airflow is guided to the boss 40 by the air shroud 30. As a result, the boss 40 can be cooled effectively by the air. This means that the cooling capability of the boss 40 is high, preventing the temperature of the boss 40 from becoming excessively high. According to the present preferred embodiment, it is possible to inhibit the temperature increase of the knock sensor 41 because the knock sensor 41 is not easily heated by the boss 40.

Moreover, the air guided by the air shroud 30 is supplied to the knock sensor 41, in addition to the boss 40. Accordingly, the knock sensor 41 itself can also be cooled effectively by the air.

The boss 40 may be provided on the crankcase 11, but in the present preferred embodiment, the boss 40 is provided on the cylinder block 12. Thus, the boss 40 is disposed at a location closer to the location at which knocking occurs. As a result, the detection accuracy of the knock sensor 41 can be increased. On the other hand, the closer the location is to the location at which knocking occurs, the higher the temperature. With the present preferred embodiment, however, air is guided to the boss 40 by the shroud 30, so the temperature increase of the boss 40 is prevented. Thus, both improvement in the detection accuracy and prevention of the temperature increase of the knock sensor 41 can be achieved at the same time.

It is also possible to provide the boss 40 on the cylinder head 13. In this case, the boss 40 is disposed at a location even closer to the location at which knocking occurs, so the detection accuracy of the knock sensor 41 is further increased. On the other hand, the cylinder head 13 tends to become hotter than the cylinder block 12. With the engine 10 according to the present preferred embodiment, however, the temperature increase of the knock sensor 41 can be suppressed and prevented because the boss 40 can be cooled effectively by the shroud 30.

The cylinder head 13 includes the top surface 13a, the right surface 13b, the bottom surface 13c, and the left surface 13d. The intake pipe 35 is connected to the top surface 13a, while the exhaust pipe 38 is connected to the bottom surface 13c. The cylinder block 12 likewise includes the top surface 12a, the right surface 12b, the bottom surface 12c, and the left surface 12d. The boss 40 is preferably provided on the top surface 12a. More specifically, the boss 40 is provided on, of the surfaces 12a to 12d of the cylinder block 12, the surface 12a that corresponds to the surface 13a of the cylinder head 13 to which the intake pipe 35 is connected. Air at ambient temperature flows through the intake pipe 35, while high-temperature exhaust gas after combustion flows through the exhaust pipe 38. Accordingly, the intake pipe 35 is cooler than the exhaust pipe 38, and the top surface 12a and the top surface 13a are cooler than the bottom surface 12c and the bottom surface 13c. According to the present preferred embodiment, the boss 40 is provided on the top surface 12a, which is cooler. Therefore, the temperature increase of the knock sensor 41 can be even more suppressed and prevented.

The knock sensor 41 is preferably mounted to the boss 40 by a bolt 42 made of a metal. Therefore, the heat of the cylinder block 12 can be transmitted to the boss 40 and the bolt 42 and released from the bolt 42 to the outside. Part of the heat of the cylinder block 12 is released without passing through the knock sensor 41. Therefore, the temperature increase of the knock sensor 41 can be suppressed and prevented, and at the same time the cooling capability of the cylinder block 12 can be improved.

In the present preferred embodiment, the intake pipe 35 or the throttle body 36 is disposed above the knock sensor 41, as illustrated in FIG. 3. When viewed from the top of the vehicle, the boss 40 and the knock sensor 41 are disposed at positions that overlap with the intake pipe 35 or the throttle body 36. The intake pipe 35 and the throttle body 36 are components that have greater strength than the knock sensor 41. Even if an object falls from above, the knock sensor 41 can be protected by the intake pipe 35 or the throttle body 36.

As the motorcycle 1 runs, an airflow from the front to the rear is produced. In the present preferred embodiment, the cylinder block 12 and the cylinder head 13 extend frontward and obliquely upward from the crankcase 11. As illustrated in FIG. 3, the cylinder axis L1 is inclined from a horizontal plane. For that reason, without any design change, air does not flow smoothly over the top surface 12a of the cylinder block 12 in comparison with the right surface 12b, the bottom surface 12c, and the left surface 12d. However, according to the present preferred embodiment, air can be supplied to the boss 40 by the air shroud 30. As a result, although the boss 40 is provided on the top surface 12a, to which air is inherently not supplied smoothly, the boss 40 can be cooled sufficiently, and the temperature increase of the knock sensor 41 can be suppressed and prevented.

The air shroud 30 covers at least a portion of the cylinder block 12 and the cylinder head 13. The air shroud 30 supplies air not only to the boss 40 but also to the cylinder block 12, the cylinder head 13, and so forth. As a result, the cylinder block 12, the cylinder head 13, and so forth can be cooled effectively. This also serves to prevent the temperature increase of the boss 40 and suppress and prevent the temperature increase of the knock sensor 41.

As illustrated in FIG. 2, the boss 40 is provided on the cylinder block 12 and is positioned more to the rear than the cylinder head 13. The air shroud 30 is configured so as to guide air generally leftward and frontward. The air shroud 30 is configured so as to guide air successively to the boss 40 and then to the cylinder head 13 in that order. The cylinder head 13 tends to become hotter than the cylinder block 12. With the present preferred embodiment, however, the air guided to the boss 40 is the air that is not yet supplied to the cylinder head 13. This means that air with a relatively low temperature that has not yet been heated by the cylinder head 13 is supplied to the boss 40. As a result, the boss 40 can be cooled more efficiently.

As illustrated in FIG. 2, in the present preferred embodiment, the distance between the center C1 of the suction port 31 and the center C2 of the boss 40 is shorter than the distance between the center C1 of the suction port 31 and the center C3 of the cylinder head 13. This means that air with a relatively low temperature that has not yet been heated by the cylinder head 13 is generally supplied to the boss 40. As a result, the boss 40 can be cooled effectively.

As illustrated in FIG. 3, the boss 40 is arranged above the cylinder axis L1, as viewed from the side. The air shroud 30 is arranged such that a portion of the air shroud 30 that is above the cylinder axis L1 has a greater flow area than a portion thereof that is below the cylinder axis L1. For this reason, in the air shroud 30, more air flows through the portion above the cylinder axis L1 than the portion below the cylinder axis L1. Since the boss 40 is disposed at a portion in which the amount of air is greater, the boss 40 can be cooled efficiently.

The fins 33 are provided on the cylinder block 12 and the cylinder head 13. As a result, the cooling capability of the cylinder block 12 and the cylinder head 13 can be enhanced. In addition, in the engine 10 according to the present preferred embodiment, the boss 40 is connected to some of the fins 33. As a result, the heat of the boss 40 does not remain in the boss 40 itself, but it is released vigorously through the fins 33. The cooling capability of the boss 40 is enhanced, and the temperature of the boss 40 is prevented from becoming excessively high. Therefore, it becomes possible to suppress and prevent the temperature increase of the knock sensor 41 further.

As illustrated in FIG. 3, the intake pipe 35 and the throttle body 36 are disposed above the boss 40. As a consequence, if the air shroud 30 is not provided, there may be cases in which the air flow stagnates in the region around the boss 40 that is above the top surface 12a of the cylinder block 12 due to the influence of the intake pipe 35 and the throttle body 36. Nevertheless, in the present preferred embodiment, a sufficient flow of air can be supplied to the boss 40, which is positioned below the intake pipe 35 or the throttle body 36, because the air shroud 30 is provided. As a result, the boss 40 can be cooled effectively, and the temperature increase of the knock sensor 41 can be suppressed and prevented.

As the motorcycle 1 runs, air flows from the front to the rear. It is also possible to cool the boss 40 and so forth by the airflow that occurs in association with running of the motorcycle 1, without using the fan 28. However, such an air flow does not occur when the motorcycle 1 temporarily stops, that is, when idling. According to the present preferred embodiment, as long as the crankshaft 17 is rotating, air can be supplied by the fan 28. Even when idling, air can be supplied to the boss 40 and so forth, so the temperature increase of the knock sensor 41 can be suppressed and prevented more effectively.

As illustrated in FIG. 3, the knock sensor 41 is disposed at a higher position than the fins 33. The protruding amount of the knock sensor 41 from the top surface 12a of the cylinder block 12 is greater than the protruding amount of the fins 33 from the top surface 12a of the cylinder block 12. As a result, air hits the knock sensor 41 more easily. The knock sensor 41 itself can be cooled effectively by the supplied air. According to the present preferred embodiment, the heat conduction from the boss 40 to the knock sensor 41 can be suppressed and prevented, and at the same time, the knock sensor 41 itself can be cooled effectively. Therefore, the temperature increase of the knock sensor 41 can be suppressed and prevented further.

While the motorcycle 1 is running, there are cases in which stone chips, dirt, and the like are kicked up from the ground. If such kicked-up stone chips and the like collide against the knock sensor 41, the mounting condition of the knock sensor 41 may worsen and the detection accuracy may degrade. In addition, the knock sensor 41 may fail. However, according to the present preferred embodiment, the boss 40 is provided on the top surface 12a of the cylinder block 12. The top surface 12a of the cylinder block 12 is less likely to be hit by the stone chips and the like that are kicked up from the ground than the right surface 12b, the bottom surface 12c, and the left surface 12d. Therefore, the knock sensor 41 can be inhibited from being hit by the stone chips and the like.

According to the present preferred embodiment, as illustrated in FIG. 2, the boss 40 is disposed at a position such that the extension line L2 of the center of the boss 40 passes through the cylinder 15, particularly at a position such that the extension line L2 intersects the cylinder axis L1. This means that the knock sensor 41 is disposed at a position such that knocking can be detected more easily. Therefore, the present preferred embodiment can increase the detection accuracy of the knock sensor 41.

Second Preferred Embodiment

As illustrated in FIG. 3, in the engine 10 according to the first preferred embodiment, the boss 40 is arranged so as to be connected to some of the fins 30. However, it is not absolutely necessary that the boss 40 is connected to some of the fins 30. As illustrated in FIG. 4, in the engine 10 according to the second preferred embodiment, the boss 40 is independent from the fins 30.

In the present preferred embodiment, no fin 33 is provided at a base portion (in other words, a rear portion) 12r of the cylinder block 12. The boss 40 is provided at the base portion 12r of the top surface of the cylinder block 12, that is, at the portion where no fin 33 is provided. However, the boss 40 may be provided on any surface of the cylinder block 12 other than the top surface thereof.

In the present preferred embodiment, a heat insulation material 45 is provided on the boss 40. The heat insulation material 45 preferably has an annular shape. The heat insulation material 45 is made of a material having a lower thermal conductivity than the material of the cylinder block 12. However, since the knock sensor 41 is a sensor that detects vibration, it is preferable that the heat insulation material 45 be made of a material that does not easily damp vibration. It is preferable that the heat insulation material 45 be made of a material that suppresses heat conduction but does not easily damp vibration. The material of the heat insulation material 45 is not particularly limited, but, for example, it is possible to suitably use a material that has a thermal conductivity of about 1/10 or less (preferably 1/100 or less) and a density of about 1/10 or greater of that of the material of the cylinder block 12.

The material of the cylinder block 12 is not particularly limited. Usable examples include ADC12 (DC material) having a thermal conductivity, as determined according to JIS R1611, of about 96 W/(m·K) and a density of about 2.68 kg/m³, AC4B (LP) having a thermal conductivity of about 134 W/(m·K) and a density of about 2.77 kg/m³, FC250 (cast iron) having a thermal conductivity of about 50 W/(m·K) and a density of about 7.3 kg/m³, and alumina ceramic having a thermal conductivity of about 29 W/(m·K) and a density of about 3.9 kg/m³. A suitable example of the heat insulation material 45 is a phenolic resin, for example. The thermal conductivity of the phenolic resin determined according to JIS A1412 is about 0.2 W/(m·K), which is less than about 1/100 of the thermal conductivities of the above-mentioned materials. In addition, the density of the phenolic resin is about 1.25 kg/m³, which is greater than 1/10 of the densities of the above-mentioned materials.

The heat insulation material 45 is placed on the boss 40, and then, the knock sensor 41 is placed on the boss 40. Thereafter, the bolt 42 is inserted through the knock sensor 41, the heat insulation material 45, and the boss 40 from above, and the bolt 42 is tightened. Thereby, the knock sensor 41 can be secured.

As illustrated in FIG. 4, as the fan 28 rotates in association with rotation of the crankshaft 17, the air outside the air shroud 30 is sucked through the suction port 31 into the air shroud 30. The sucked air A is guided generally frontward, and is supplied to the boss 40 and the knock sensor 41. The boss 40 and the knock sensor 41 are cooled by this air. The air that has cooled the boss 40 and the knock sensor 41 flows along the cylinder block 12 and the cylinder head 13 from the front to the left, to cool the cylinder block 12 and the cylinder head 13.

As illustrated in FIG. 4, fins 33 are arranged in front of the boss 40. The air shroud 30 is configured so as to guide air successively to the boss 40 and then to the fins 33 in that order. The distance between the center C1 of the suction port 31 and the center C2 of the boss 40 is shorter than the minimum distance between the center C1 of the suction port 31 and the fins 33. Here, the term "the minimum distance between the center C1 of the suction port 31 and the fins 33" means the distance between the center C1 of the suction port 31 and a portion 33t of the fins 33 that is closest to the center C1 of the suction port 31. The air with a relatively low temperature that is sucked from the suction port 31 flows through the surrounding region of the boss 40 and the knock sensor 41. At that time, the air itself is heated because it cools the boss 40 and the knock sensor 41, and the temperature thereof increases. The air the temperature of which has been raised is supplied to the fins 33. The fins 33 are cooled by the air the temperature of which has been raised.

In the present preferred embodiment as well, the temperature increase of the knock sensor 41 can be suppressed and prevented because the air shroud 30 supplies airflow to the boss 40 and the knock sensor 41.

In addition, in the present preferred embodiment, the air shroud 30 is configured so as to guide air successively to the boss 40 and then to the fins 33 in that order. For this reason, the boss 40 and the knock sensor 41 are supplied with air with a relatively low temperature before cooling the fins 33. Thus, the temperature increase of the knock sensor 41 can be suppressed and prevented more effectively.

The temperature of the engine 10 becomes higher from the crankcase 11, then the cylinder block 12, then to the cylinder head 13, in that order. In the present preferred embodiment as well, the air shroud 30 is configured so as to guide air successively to the boss 40 and then to the fins 33 in that order. The air that has not yet been heated by the cylinder head 13 is supplied to the boss 40 and the knock sensor 41. Thus, the temperature increase of the knock sensor 41 can be suppressed and prevented more effectively.

The air shroud 30 generally supplies air to the crankcase 11, then to the cylinder block 12, and then to the cylinder head 13, in that order. As a result, the air generally flows from a portion at a low temperature to a portion at a high temperature, making it possible to cool the engine 10 efficiently.

Moreover, in the present preferred embodiment, the heat insulation material 45 is interposed between the boss 40 and the knock sensor 41. This further serves to prevent the knock sensor 41 from being heated by the boss 40. As a result, the temperature increase of the knock sensor 41 can be suppressed and prevented even further.

Third Preferred Embodiment

Figure 5:
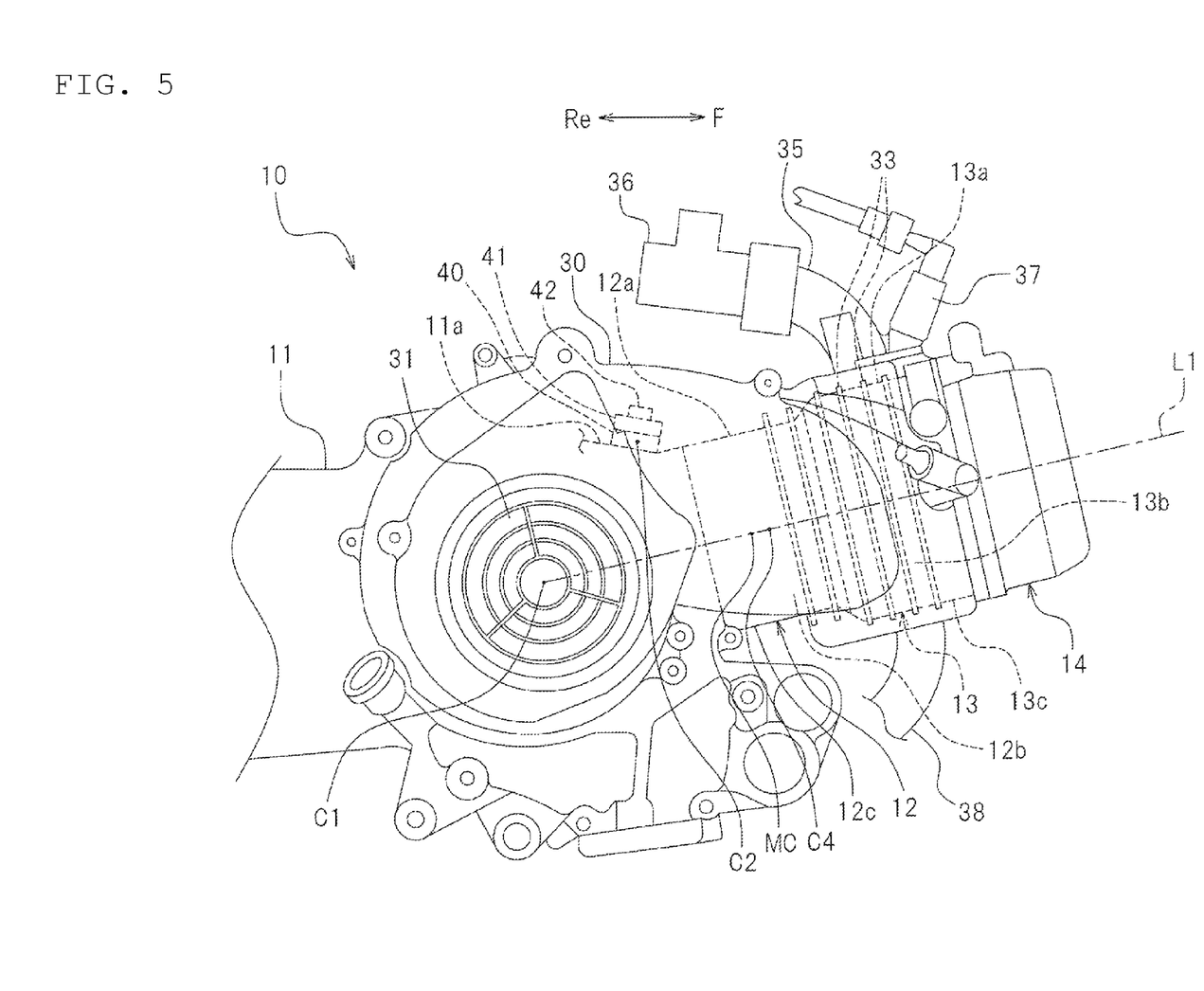
FIG. 5 is a right side view illustrating a portion of an engine according to a third preferred embodiment of the present invention.

In the first and second preferred embodiments, the boss 40 is provided on the cylinder block 12. However, the boss 40 may be provided on a portion other than the cylinder block 12. As illustrated in FIG. 5, in the engine 10 according to the third preferred embodiment, the boss 40 is provided on the crankcase 11.

The position of the boss 40 is not particularly limited, but in the present preferred embodiment, the boss 40 is provided on a front portion of the crankcase 11. In other words, the boss 40 is provided in a portion of the crankcase 11 near the cylinder block 12. The boss 40 is provided on the top surface 11a of the crankcase 11, and it is arranged so as to extend frontward and obliquely upward.

The rest of the configurations are similar to the first preferred embodiment, and therefore a further description thereof will be omitted. In the present preferred embodiment as well, the air shroud 30 is fitted to the crankcase 11, the cylinder block 12 and the cylinder head 13.

The distance between the center C1 of the suction port 31 of the air shroud 30 and the center C2 of the boss 40 is shorter than the distance between the center C1 of the suction port 31 and the center C4 of the cylinder block 12. Note that the term "the center of the cylinder block 12" means the midpoint between one end of the cylinder block 12 along the cylinder axis L1 and the other end thereof.

In FIG. 5, point MC is a point that is positioned on the cylinder axis L1 and at the midpoint between the top dead center and the bottom dead center of the piston. The distance between the center C1 of the suction port 31 and the center C2 of the boss 40 is shorter than the distance between the center C1 of the suction port 31 and the just-described point MC.

The air that is sucked by the fan 28 from the suction port 31 generally flows over the crankcase 11, then the cylinder block 12, and then the cylinder head 13 in that order. The air before cooling the cylinder block 12 and the cylinder head 13 is supplied to the boss 40 and the knock sensor 41. The air that has cooled the boss 40 and the knock sensor 41 is thereafter supplied to the cylinder block 12 and the cylinder head 13, to cool the cylinder block 12 and the cylinder head 13.

In the present preferred embodiment as well, the temperature increase of the knock sensor 41 can be suppressed and prevented because the air shroud 30 supplies air to the boss 40 and the knock sensor 41.

In addition, as described previously, the crankcase 11 has a lower temperature than the cylinder block 12 and the cylinder head 13. Therefore, according to the present preferred embodiment, the temperature increase of the boss 40 can be suppressed and prevented even more, and the temperature increase of the knock sensor 41 can be suppressed and prevented even further.

The air with a relatively low temperature that has not yet been heated by the cylinder block 12 or the cylinder head 13 is supplied to the boss 40 and the knock sensor 41. As a result, the boss 40 and the knock sensor 41 can be cooled effectively.

Fourth Preferred Embodiment

Figure 6:
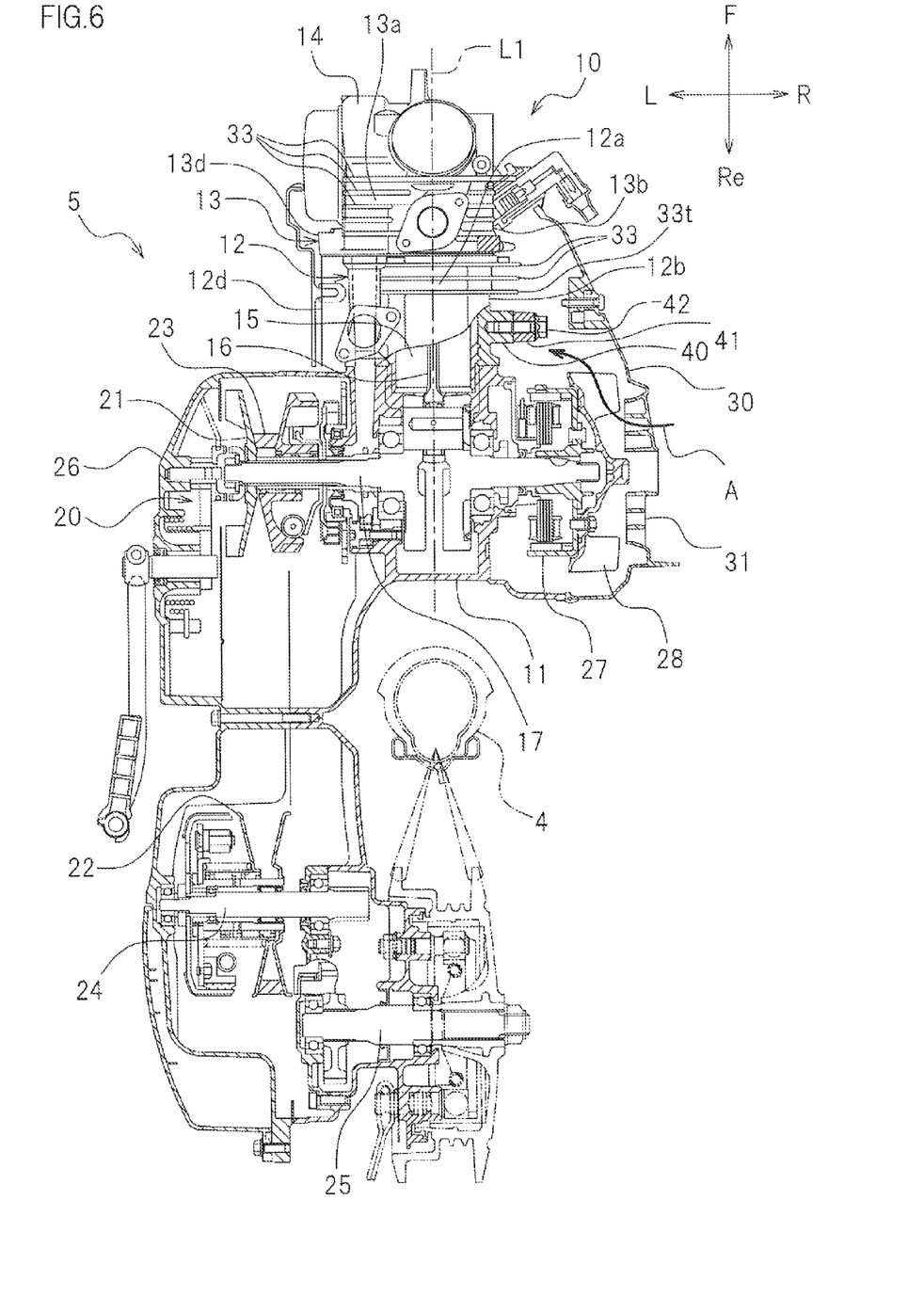
FIG. 6 is a cross-sectional view corresponding to FIG. 2, illustrating an engine unit according to a fourth preferred embodiment of the present invention.

In the first and second preferred embodiments, the boss 40 is provided on the top surface 12a of the cylinder block 12. In the third preferred embodiment, the boss 40 is provided on the top surface 11a of the crankcase 11. However, the boss 40 may be provided on, for example, surfaces of the cylinder block 12 other than the top surface 12a thereof. As illustrated in FIG. 6, in the engine 10 according to the fourth preferred embodiment, the boss 40 is provided on the right surface 12b of the cylinder block 12.

In the present preferred embodiment, no fin 33 is provided at a base portion of the cylinder block 12, and the boss 40 is provided on the right surface 12b of the base portion thereof. The boss 40 is independent from the fins 33. However, the boss 40 may be connected to some of the fins 40 as in the first preferred embodiment. The rest of the configurations are similar to the first preferred embodiment, and therefore further description thereof will be omitted.

In the present preferred embodiment as well, the temperature increase of the knock sensor 41 can be suppressed and prevented because the air shroud 30 supplies airflow to the boss 40 and the knock sensor 41.

The boss 40 may be provided on a side surface of the cylinder block 12 or the cylinder head 13 in which the suction port 31 of the air shroud 30 is provided. In the present preferred embodiment, the suction port 31 is provided in a right side portion of the air shroud 30, and the air is introduced from the right to the left. The boss 40 is provided on the right surface 12b of the cylinder block 12 and the knock sensor 41 is disposed on the right side of the cylinder block 12. Accordingly, the air introduced from the suction port 31 can be supplied immediately to the boss 40 and the knock sensor 41. As a result, the boss 40 and the knock sensor 41 can be cooled effectively.

When viewed in plan, the fan 28 is opposed to the suction port 31 and is disposed on the right side of the cylinder axis L1. The boss 40 is disposed on the right side of the cylinder axis L1, when viewed in plan. That is, the boss 40 is disposed between the fan 28 and the cylinder axis L1, when viewed in plan. For this reason, the air introduced from the suction port 31, which has a relatively low temperature, can be supplied to the boss 40.

In this preferred embodiment as well, the boss 40 and the knock sensor 41 are supplied with air with a relatively low temperature before cooling the fins 33. As a result, the boss 40 and the knock sensor 41 can be cooled effectively, and the temperature increase of the knock sensor 41 can be sufficiently suppressed and prevented.

Other Modified Preferred Embodiments

As illustrated in FIG. 2, in the engine 10 according to the first preferred embodiment, the boss 40 is provided at a position such that the extension line L2 of the center of the boss 40 intersects the cylinder axis L1. However, the position of the boss 40 is not particularly limited. For example, it is also possible to allow the boss 40 to be arranged rightward or leftward from the cylinder axis L1.

The engine 10 in the foregoing preferred embodiments preferably is a horizontally mounted type engine in which the cylinder axis L1 extends in a horizontal direction or in a substantially horizontal direction. However, the direction of the cylinder axis L1 is not limited to the horizontal direction or the substantially horizontal direction. The engine 10 may be what is called a vertically mounted type engine, in which the cylinder axis L1 extends in a substantially vertical direction. For example, the inclination angle of the cylinder axis L1 from a horizontal plane may be, for example, about 45 degrees or greater, or about 60 degrees or greater.

The engine 10 is not limited to a unit swing type engine that swings relative to the body frame but may be an engine that is non-swingably fixed to the body frame.

In each of the foregoing preferred embodiments, the engine 10 includes the fan 28 that rotates with the crankshaft 17. In the foregoing preferred embodiments, the fan 28 forcibly supplies air to the boss 40. However, the internal combustion engine according to the present invention may not necessarily include the fan 28. In a straddle-type vehicle such as the motorcycle 1, an airflow from the front to the rear is produced as the vehicle runs. The air shroud 30 may be configured to supply the airflow that is produced naturally in association with the running of the vehicle. Alternatively, the air shroud 30 may be configured to supply both the airflow produced by the fan 28 and the airflow produced by the running of the vehicle to the boss 40 and so forth.

In the foregoing preferred embodiments, the fan 28 is preferably driven by the crankshaft 17. However, the fan to generate an airflow is not limited to the one driven by the crankshaft 17. For example, it is also possible to use a fan that is driven by an electric motor. Moreover, the position, shape, and dimensions of the suction port 31 of the air shroud 30 are not limited to those described in the foregoing preferred embodiments.

The shroud according to the preferred embodiments of the present invention is not limited to the air shroud 30 that covers portions of the cylinder block 12 and so forth. The shroud is not limited to a single component, but may be one in which a plurality of components are combined.

In each of the foregoing preferred embodiments, the engine 10 is preferably an air-cooled engine. However, the internal combustion engine according to a preferred embodiment of the present invention may be a water-cooled engine. Alternatively, it may be an engine a portion of which is cooled by air but another portion of which is cooled by coolant. For example, fins may be provided on the cylinder block and at the same time a water jacket may be provided in the cylinder head so that the cylinder block can be cooled by air while the cylinder head can be cooled by coolant.

In each of the foregoing preferred embodiments, the engine 10 is preferably a four-stroke engine. However, the internal combustion engine according to a preferred embodiment of the present invention may be a two-stroke engine, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A single-cylinder internal combustion engine for a vehicle, the single-cylinder internal combustion engine comprising:
    a crankcase accommodating a crankshaft;
    a cylinder block connected to the crankcase and including only a single cylinder provided therein;
    a cylinder head connected to the cylinder block;
    a sensor mounting boss provided on the crankcase or the cylinder block;
    a sensor arranged to detect knocking of the single-cylinder internal combustion engine, the sensor being mounted to the boss; and
    an air guide member mounted to at least a portion of the crankcase, the cylinder block, or the cylinder head, to guide air at least to the sensor mounting boss; wherein
    the crankcase, the cylinder block, and the cylinder head are arranged in this order from a rear to a front of the vehicle;
    the air guide member comprises a shroud including a suction port positioned at a side of the crankcase and arranged to allow air to flow into the shroud and covering at least a portion of the crankcase, the cylinder block, and the cylinder head but not covering at least another portion of the cylinder head, and a fan to introduce air into the shroud in association with rotation of the crankshaft;
    a distance between a center of the suction port and a center of the sensor mounting boss in a direction along a cylinder axis is shorter than a distance between the center of the suction port and the cylinder head in the direction along the cylinder axis; and
    an entire body of the single-cylinder combustion engine is configured to be cooled by air.

2. The single-cylinder internal combustion engine according to claim 1, wherein:
    each of the cylinder block and the cylinder head includes a top surface, a bottom surface, a left surface, and a right surface;
    an intake pipe is connected to one of the top surface, the bottom surface, the left surface, and the right surface of the cylinder head, and an exhaust pipe is connected to an opposite surface to the surface to which the intake pipe is connected; and
    the sensor mounting boss is provided on a surface of the cylinder block that corresponds to the surface of the cylinder head to which the intake pipe is connected.

3. The single-cylinder internal combustion engine according to claim 1, wherein:
    a fin is provided on at least a portion of the cylinder block and a fin is provided on at least a portion of the cylinder head; and
    the air guide member is configured to guide air to the sensor mounting boss and to the fins, in that order.

4. The single-cylinder internal combustion engine according to claim 1, wherein:
the air guide member is configured to guide air to the sensor mounting boss and to the cylinder head, in that order.

5. The single-cylinder internal combustion engine according to claim 1, wherein:
the sensor mounting boss is provided on the crankcase; and
the air guide member is configured to guide air to the sensor mounting boss and to the cylinder block, in that order.

6. The single-cylinder internal combustion engine according to claim 1, wherein:
the sensor mounting boss is provided on the crankcase; and
the distance between the center of the suction port and the center of the sensor mounting boss is shorter than a distance between the center of the suction port and a center of the cylinder block.

7. The single-cylinder internal combustion engine according to claim 1, wherein:
a fin is provided on the cylinder block; and
the distance between the center of the suction port and the center of the sensor mounting boss is shorter than a minimum distance between the center of the suction port and the fin.

8. The single-cylinder internal combustion engine according to claim 1, wherein:
the sensor is mounted to the sensor mounting boss by a bolt; and
the bolt is made of a metal.

9. The single-cylinder internal combustion engine according to claim 1, wherein:
the sensor mounting boss is disposed between the fan and the cylinder axis when viewed in plan.

10. The single-cylinder internal combustion engine according to claim 1, wherein:
the sensor mounting boss is provided above the cylinder axis when viewed from a side; and
a portion of the shroud above the cylinder axis has a greater flow area than a portion of the shroud below the cylinder axis.

11. A straddle-type vehicle comprising:
at least a front wheel and a rear wheel; and
a single-cylinder internal combustion engine according to claim 1.

12. A single-cylinder internal combustion engine for a vehicle, the single-cylinder internal combustion engine comprising:
a crankcase accommodating a crankshaft;
a cylinder block connected to the crankcase and including only a single cylinder provided therein;
a cylinder head connected to the cylinder block;
a sensor mounting boss provided on the crankcase or the cylinder block;
a sensor arranged to detect knocking of the single-cylinder internal combustion engine, the sensor being mounted to the boss; and
an air guide member mounted to at least a portion of the crankcase, the cylinder block, or the cylinder head, to guide air at least to the sensor mounting boss; wherein
the crankcase, the cylinder block, and the cylinder head are arranged in this order from a rear to a front of the vehicle;
the air guide member comprises a shroud including a suction port positioned at a side of the crankcase and arranged to allow air to flow into the shroud and covering at least a portion of the crankcase, the cylinder block, and the cylinder head but not covering at least another portion of the cylinder head, and a fan to introduce air into the shroud in association with rotation of the crankshaft;
a distance between a center of the suction port and a center of the sensor mounting boss in a direction along a cylinder axis is shorter than a distance between the center of the suction port and a point that is on the cylinder axis and at a midpoint between a top dead center of a piston and a bottom dead center thereof in the direction along the cylinder axis; and
an entire body of the single-cylinder combustion engine is configured to be cooled by air.

13. The single-cylinder internal combustion engine according to claim 12, wherein:
each of the cylinder block and the cylinder head includes a top surface, a bottom surface, a left surface, and a right surface;
an intake pipe is connected to one of the top surface, the bottom surface, the left surface, and the right surface of the cylinder head, and an exhaust pipe is connected to a surface opposite to the surface to which the intake pipe is connected; and
the sensor mounting boss is provided on a surface of the cylinder block that corresponds to the surface of the cylinder head to which the intake pipe is connected.

14. The single-cylinder internal combustion engine according to claim 12, wherein:
the sensor mounting boss is provided on the crankcase; and
the distance between the center of the suction port and the center of the sensor mounting boss is shorter than a distance between the center of the suction port and a center of the cylinder block.

15. The single-cylinder internal combustion engine according to claim 12, wherein:
a fin is provided on the cylinder block; and
the distance between the center of the suction port and the center of the sensor mounting boss is shorter than a minimum distance between the center of the suction port and the fin.

16. The single-cylinder internal combustion engine according to claim 12, wherein:
the sensor mounting boss is disposed between the fan and the cylinder axis when viewed in plan.

17. The single-cylinder internal combustion engine according to claim 12, wherein:
the sensor mounting boss is provided above the cylinder axis when viewed from a side; and
a portion of the shroud above the cylinder axis has a greater flow area than a portion of the shroud below the cylinder axis.

18. A straddle-type vehicle comprising:
at least a front wheel and a rear wheel; and
a single-cylinder internal combustion engine according to claim 12.

* * * * *